Oct. 19, 1926.

B. S. HORNBY 1,603,849

POWER SYSTEM

Original Filed Feb. 1, 1924

Inventor:
Benjamin S. Hornby,
by Alexander S. Lentz
His Attorney.

Patented Oct. 19, 1926.

1,603,849

UNITED STATES PATENT OFFICE.

BENJAMIN S. HORNBY, OF BOLTON, ENGLAND, ASSIGNOR TO GENERAL ELECTRIC COMPANY, A CORPORATION OF NEW YORK.

POWER SYSTEM.

Application filed February 1, 1924, Serial No. 689,941, and in England February 7, 1923. Renewed March 9, 1926.

My invention relates to systems for transmitting power at high voltage, and has for its object the provision of means for transmitting polyphase alternating current through underground or submerged cables at high voltage without excessive losses in the cables.

In transmitting power through underground or marine cables it has been customary to use a single cable comprising all the conductors of the polyphase line. In three phase systems, for example, it is usual practice to use three core cables. When three core cables are to be operated at high voltage, however, there are involved certain difficulties among which may be mentioned the large diameter of the cable due to the necessity of insulating each of the conductors for the full line voltage. Separate cables for each conductor are therefore desirable because of their smaller diameter and due to the fact that each conductor has only to be insulated for the voltage to ground which is about 58% of the line voltage. In the past, however, the use of separate cables has been limited because of their excessive sheath losses due to induction and the like. In accordance with my invention means are provided for neutralizing the inductance of the cables in such a manner as to make possible the use of separate cables for the different phases of the system.

My invention will be better understood on reference to the following description when considered in connection with the accompanying drawing and its scope will be pointed out by the appended claims.

Figure 1:
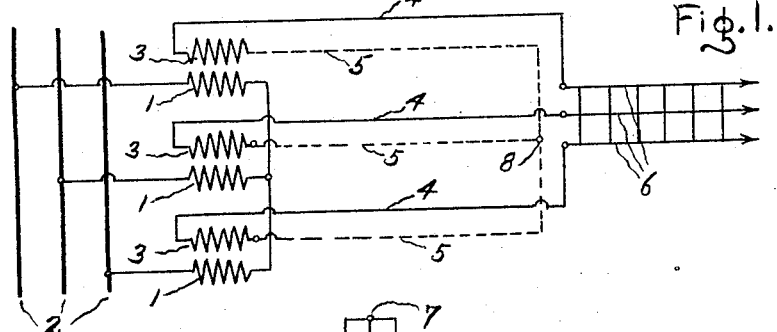
Figure 2:
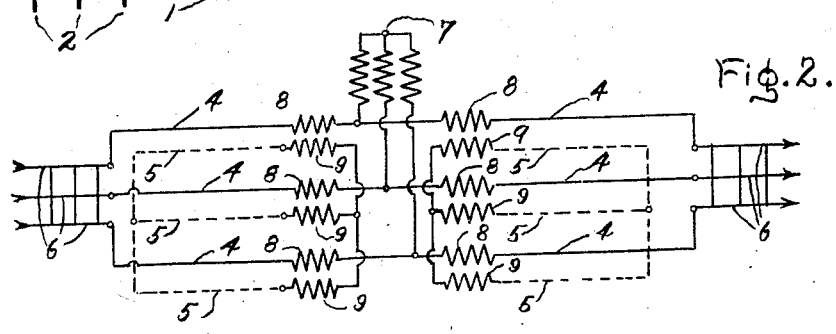
Figure 3:
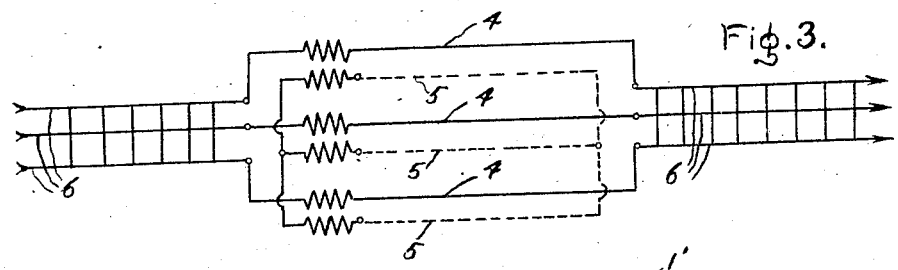
Figure 4:
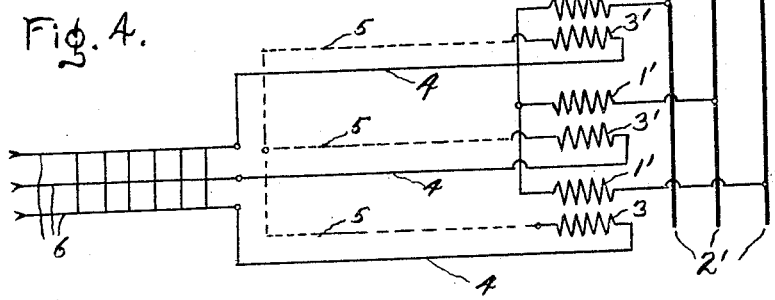

Referring now to the drawing, Figs. 1 and 4 show my invention as used in cases where a step-up transformer is provided for raising or lowering the voltage applied to the cables, and Figs. 2 and 3 show my invention as embodied in a system in which the cables are operated at the same voltage as the bus bars or other parts of the system to which they are connected.

Fig. 1 shows a step-up transformer provided with primary windings 1 connected in star to the conductors or bus bars 2 and with secondary windings 3 connected to an overhead transmission system comprising conductors 6 through underground or marine cables each of which comprises an inner conductor 4 and an outer conductor 5 which is concentric with the conductor 4. As will be apparent from the drawing, each of the cables has its outer conductor point connected to a common point 8 which is the neutral point of the system. Under these conditions the inductive effects of the current in the inner conductor are neutralized by the current in the outer conductor. Each of the cables will, therefore, operate without substantial inductance, and the disadvantage of using separate cables for the different phases of the system is obviated.

Fig. 4 is similar to Fig. 1 but shows the connections at the other end of the transmission system where $3^1$ indicates the primary windings of the transformer, $1^1$ the secondary windings and $2^1$ the conductors of the distribution system. It is of course obvious that the entire system may consist of underground cables instead of a combination of such cables and overhead transmission lines as indicated by the drawing.

Fig. 2 shows an arrangement suitable for use in a town where power is supplied from the transmission system, the overhead transmission line 6 in this case being connected to the cables at each end and a transformer 7 being provided to supply current to the town. On each side of the taps to the transformer 7 are provided current transformers having primary windings 8 and secondary windings 9, these transformers being so arranged that the current in the outer conductors 5 is opposed to that in the inner conductors 4. The double set of current transformers are provided because of the difference in the current on the two sides of the taps to transformer 7 and are preferably installed in a sub-station together with the transformer 7.

Fig. 3 shows an arrangement suitable for use where it is necessary to take the line underground through a village, under a railway track or under a river, for example. In this case only one set of current transformers is required because of the fact that the same current flows through the entire cable.

The outer conductors of the cables may be insulated for low or medium voltages if desired. In case of comparatively short lengths of cable the cost and size of the cable may be reduced by placing the outer conductor directly in contact with the lead sheathing or by dispensing with it entirely when the lead sheathing is of sufficient conductivity to carry the line current. Where the cable length is short the current transformer may be replaced by a laminated core placed between the inner and outer cables. My invention may be embodied in many other forms than those shown and described. I, accordingly, do not wish to be restricted to the particular forms of construction disclosed herein by way of example for the purpose of setting forth my invention in accordance with the patent statutes. The terms of the appended claims, are, therefore, not restricted to the precise structure disclosed, but are intended to cover all changes and modifications within the spirit and scope of my invention.

What I claim as new and desire to secure by Letters Patent of the United States, is:—

1. A polyphase power system comprising a plurality of separate cables each arranged to conduct current of one phase only and each provided with an outer and inner conductor, means interconnecting the outer conductors of said cables at one end, and a polyphase transformer associated with the opposite end of said cables to cause the current in each inner conductor to be opposed to the current in the outer conductor by which it is surrounded whereby the inductive losses of said cables are reduced.

2. A polyphase power system comprising a plurality of separate cables each arranged to conduct current of one phase only and each provided with an outer and an inner conductor, current transformers each having its primary winding connected in series with the inner conductor of a different phase and each having its secondary winding connected in series with an outer conductor of a different phase, means interconnecting said secondary windings at one end of said cables and means interconnecting said outer conductors at the other end of said cables.

In witness whereof, I have hereunto set my hand this 18th day of January, 1924.

B. S. HORNBY.